Patented Dec. 21, 1926.

1,611,524

UNITED STATES PATENT OFFICE.

HENRI GUILLEMARD, OF LYON, FRANCE.

PROCESS FOR PURIFICATION OF AIR RENDERED IMPURE BY CARBON MONOXIDE OR OTHER DELETERIOUS GASES AND INTENDED FOR RESPIRATION.

No Drawing. Application filed May 14, 1920, Serial No. 381,513, and in France October 3, 1917.

This invention relates to a process for the purification of respirable air, with the object of providing an efficient protection against carbon monoxide or other deleterious gases.

The process consists essentially in causing the air which is to be taken into the lungs to undergo the action of a mixture of iodic acid or anhydride or ioda'es (or equivalents) and sulphuric acid, in such manner as to effect the oxidation of carbon monoxide at the ordinary temperature. The process also involves the use of a suitable supporting substance of an inert nature such as pumice stone which is properly granulated and impregnated with the substances composing the oxidizing mixture, and this method of disposing the oxidizing reagent offers very considerable advantages as regards the permeability to air and also from the fact that it affords the maximum amount of effective surface.

The iodo-sulphuric reagent is preferably prepared in the following manner. Grains of pumice stone are shaken up in a well-dried bottle with the proper amount of concentrated sulphuric-acid, and when the sulphuric acid is absorbed by the pumice stone, there is added a small quantity of iodic anhydride, and the whole is shaken up again. The iodic anhydride adheres to the grains and covers their surface, and the mass of grains thus prepared will act with reference to the air passing through the interstices so as to afford an immediate contact between the air and the active part of the iodic reagent which will thus be effective over a considerable surface.

By way of example, the following approximate proportions can be employed to advantage:

Granulated pumice stone: 270 grammes; concentrated sulphuric acid: 25 cubic centimeters; iodic anhydride: 90 grammes.

After the air which is to be inhaled has traversed the oxidizing reagent, it is preferably caused to traverse an absorbent reagent (carbon, caustic alkali, or a peroxide such as oxylithe, etc.) which among others shall have the effect of absorbing the iodine set free by the reaction of the carbon monoxide upon the iodic acid. If required, this absorbent reagent is carried by a suitable supporting substance, and may for instance be prepared in a similar manner to what has been described for the absorbent reagent.

The oxidizing and absorbent reagents are disposed in such manner that the air which is drawn in shall pass through the same in the proper sequence. But it is preferable to so operate that the air sent out by expiration shall be directed in such manner as not to traverse the oxidizing and absorbent reagents a second time and in the contrary sense, but to cause the air which has been previously inhaled and is now charged with moisture to escape directly into the outer air without passing through the said reagents, in order that the moisture contained in the emitted air shall not cause an accumulation of water in the mass of the absorbent reagent.

Instead of employing a method in which the oxidizing and absorbent reagents are situated adjacent to each other, it is preferable to cause these reagents to be situated at a sufficient distance from each other that there shall be no tendency for one part of a reagent to be transported or to flow towards another part, which would bring about a harmful reaction in the mixture. It is also for this reason that the expelled air shall be preferably delivered directly into the atmosphere without having to traverse the reagents, since the water with which it would saturate the absorbent reagent would have a strong tendency to flow towards the oxidizing reagent and thus give rise to a mixture of an injurious nature.

For the same reason, the two reagents are preferably disposed in a separable manner, in order that they may be properly brought together when the process is in actual use, but may be completely separate when the process is out of use, in order that the water vapor of the atmosphere with which the reagent may become saturated shall not flow from one to the other and thus give rise to mixtures of a harmful nature.

Claims—

1. A process for removing deleterious gases from air for the purpose of rendering it respirable consisting in subjecting the air to the action of an iodic compound in the presence of sulphuric acid.

2. A process for removing carbon monoxide from air for the purpose of rendering it respirable consisting in subjecting the air to the action of iodic acid in the presence of sulphuric acid whereby the carbon monoxide will be oxidized at ordinary temperature.

3. A process for removing carbon monoxide from air for the purpose of rendering it respirable consisting in subjecting the air first to the action of an oxidizing reagent including an iodic compound with sulphuric acid and then to the action of an absorbent reagent having the property of absorbing the iodine set free by the action of the carbon monoxide on the oxidizing reagent.

4. A process for removing carbon monoxide from air to render it respirable consisting in subjecting the air to a mixture of iodic anhydride and concentrated sulphuric acid and then to an absorbent agent.

5. A process for removing carbon monoxide from air to render it respirable, consisting in subjecting it to a mixture of 90 grammes of iodic anhydride and 25 cubic centimeters of concentrated sulphuric acid and subsequently subjecting it to the action of an absorbent agent.

6. A process for removing carbon monoxide from air without heating for the purpose of rendering it respirable, consisting in passing atmospheric air through a permeable substance saturated with sulphuric acid and coated with iodic anhydride.

7. A process for removing carbon monoxide from air for the purpose of rendering it respirable, consisting in passing atmospheric air through granulated pumice stone previously saturated with concentrated sulphuric acid and coated with iodic anhydride, the proportion of the ingredients being 270 grams of pumice stone to 25 cubic centimeters of sulphuric acid and 90 grams of iodic anhydride.

8. A process for removing carbon monoxide from air for the purpose of rendering it respirable, consisting in first passing atmospheric air through granulated pumice stone previously saturated with sulphuric acid and coated with iodic anhydride and subsequently passing said air through an absorbent agent.

9. The process of preparing an oxidizing absorbent material which comprises reacting on iodic anhydrid with concentrated sulfuric acid.

10. The process of preparing an oxidizing absorbent material which comprises uniformly mixing concentrated sulfuric acid with granulated inert supporting material, adding to the mixture iodic anhydrid, uniformly mixing the whole, allowing the reaction to be completed and suitably comminuting the product.

11. The process of preparing an oxidizing absorbent material which comprises uniformly mixing concentrated sulfuric acid with granulated pumice as a supporting material, adding to the mixture iodic anhydrid, and uniformly mixing the whole, allowing the reaction to be completed and suitably comminuting the product.

12. An oxidizing absorbent material comprising a combination of sulfuric anhydrid and iodic anhydrid which material is capable of oxidizing carbon monoxide at ordinary temperatures.

13. An active oxidizing material comprising the product resulting from the interaction of iodic anhydrid and concentrated sulfuric acid.

14. An oxidizing absorbent material containing in combination iodic anhydrid, sulfuric anhydrid, and water, which material is a substantially colorless composition capable of oxidizing and absorbing easily oxidizable gases.

In testimony whereof, I have signed my name to this specification.

HENRI GUILLEMARD.